April 22, 1958     W. C. SHAW     2,831,260
KNEECAP GAUGE FOOT
Filed June 27, 1957
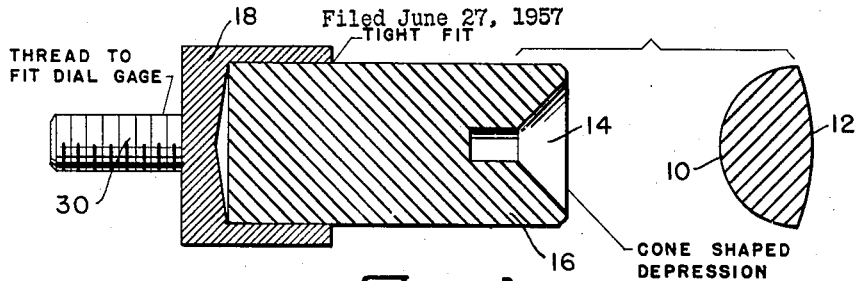
Fig. 1
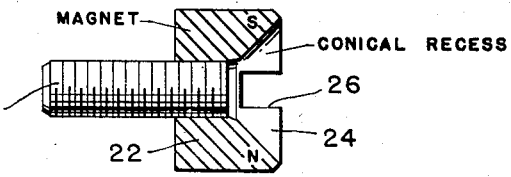
Fig. 4
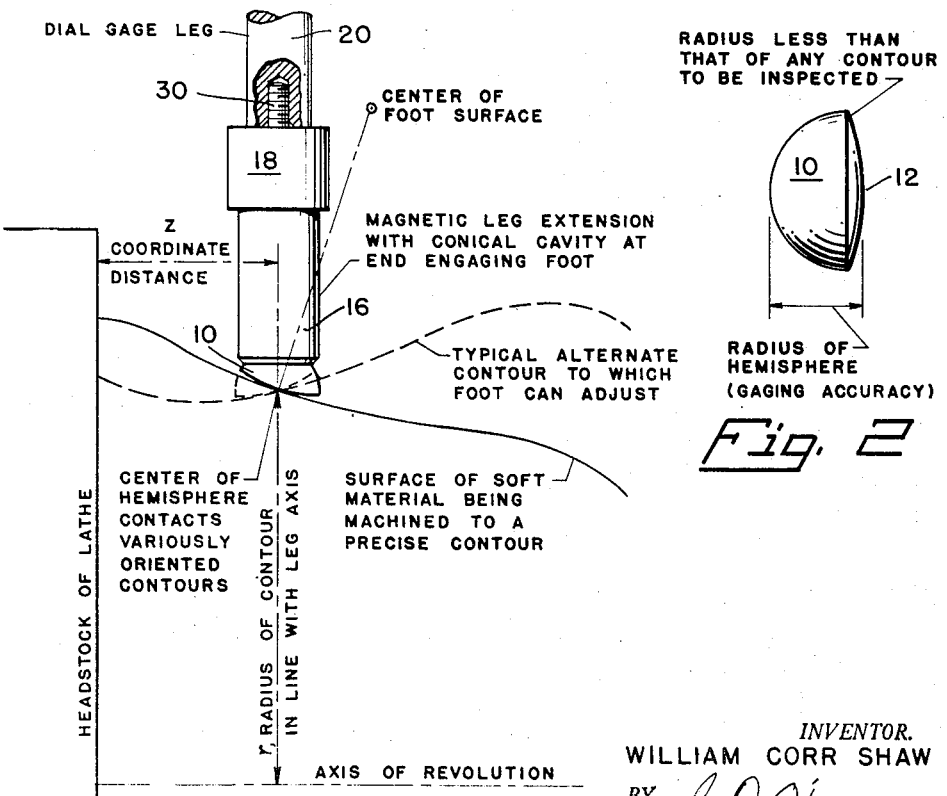
Fig. 2
Fig. 3
INVENTOR.
WILLIAM CORR SHAW
BY
ATTORNEYS

United States Patent Office 2,831,260
Patented Apr. 22, 1958

2,831,260

KNEECAP GAUGE FOOT

William C. Shaw, China Lake, Calif., assignor to the United States of America as represented by the Secretary of the Navy Application June 27, 1957, Serial No. 668,580

3 Claims. (Cl. 33—174)

(Granted under Title 35, U. S. Code (1952), sec. 266)

The invention described herein may be manufactured and used by or for the Government of the United States of America for governmental purposes without the payment of any royalties thereon or therefor.

The present invention relates to a device for accurately gauging contoured objects and more particularly to a feeler gage foot which will automatically orient itself to the curvature of an object being inspected.

The invention consists of a hemispherically shaped gauge foot which rests against the surface of a contoured object or a cam surface in a manner such that motion of the foot along its supporting axis is a simple function of the surface contour. The foot is held in a conically shaped cavity preferably by magnetic attraction, and can rotate therein as the gauge foot follows a curved surface. The kneecap gauge foot was developed for dimensional gauging of specimens of relatively soft or porous material having a curved contour surface. It is also useful with hard materials, and the principle employed may be applied to the design of cam riders for use in computers. The device of the present invention has two characteristic advantages over conventional gauge feet; namely, the foot automatically orients itself relative to the curvature of the specimen; and the contact surface of the foot is comparatively large, thus minimizing deformation of the specimen from contact pressure.

The purpose of a gauge foot is to accurately specify one coordinate dimension on a surface as a function of one or two other coordinates. Such measurements can sometimes be satisfactorily obtained with a very sharp point or edge serving as a gauge foot. However, except with the very hardest materials, this type of gauge foot may scratch or penetrate the specimen, or may cause in accuracies in measurements resulting from deformation.

Inspection of a soft surface usually requires a gauge foot with a curved contacting surface in order to distribute the force of contact over a large area. In this case, accurate location of a point on the surface being examined requires inconvenient trigonometric computation involving the slope of the surface at the contact point and the radius of the gauge foot at this point.

It is an object of the present invention, therefore, to provide a new and improved foot for a feeler gauge or cam follower.

Another object of the invention is to provide a new and improved gauge foot which automatically orients itself relative to the contour of a curved surface.

A further object of the invention is to provide an accurate gauge foot which will not scratch or deform the surface being inspected from contact pressure.

Further objects and many of the attendant advantages of the invention will become apparent as the same becomes better understood from the following detailed description had in conjunction with the annexed drawings wherein:

Fig. 1 is a longitudinal, partially exploded, cross sectional view of the preferred embodiment of the invention;

Fig. 2 is a side view of the kneecap foot of the present invention;

Fig. 3 is a side view showing the operation of the kneecap gauge foot;

Fig. 4 is a cross sectional side view of a modified magnetic socket for holding the kneecap foot.

Referring now to the drawings like numerals refer to like parts in all of the figures. The kneecap foot was so named in order to describe briefly its appearance and action. In Figs. 1, 2 and 3 part 10 is nearly one-half a steel ball with one side 12 ground to a convex surface so that the center of the original ball coincides with the center of the convex surface. The radius of curvature of the ground convex surface 12 is considerably larger than that of the ball and slightly smaller than that of the curvature of the specimen to be measured.

The foot 10 of the gauge is magnetically held in a socket 14 so that the original ball surface is in contact with the socket 14 and the foot 10 is free to rotate about the center of its ground surface 12. The socket is an end cavity in a round bar magnet 16 which is held by member 18 and forms an extension to a conventional dial gauge leg 20. The cavity of socket 14 is conical and should be ground concentric with the gauge leg axis. The round bar 16 having a socket 14 may be magnetized longitudinally but, for examining magnetic materials a modification, such as in Fig. 4, should be used wherein a short round bar 22 is used having a socket cavity 24, as in Fig. 1, but provided with a slot 26 and magnetized with a north and south pole at the end, thus providing a path for the magnetic flux through the foot 10. A threaded portion 30, or any conventional means, may be used to attach the gauge foot assembly to a dial gauge leg 20.

When the edge of the gauge foot touches the surface under inspection, any downward motion of the gauge foot will cause it to rotate until the center portion of its ground surface is in contact with the surface under inspection. In this position the center of the contact surface is theoretically in the axis of the gauge leg 20, thus definitely locating a gauging point on the surface under inspection.

Fig. 3 illustrates a typical application of the gauge foot of the present invention. In this application a soft, porous material is being machined on a lathe to a contour specified in cylindrical coordinates $r$ and $z$. The observed value of $r$, the radius of contour, is independent of the slope of the contour at the gauging point.

A small positive error is introduced by friction which prevents perfect alignment of the two contact surfaces. The error resulting from deformation of the surface under inspection, however, is negative, and can be made to cancel the friction error by controlling the contact pressure.

Other modifications of the kneecap gauge foot assembly may be in the use of a vacuum, a spring, or a thin film of oil or grease for supporting the hemispherical portion of the foot 10 in the concave cavity 14 in such a manner as to permit free rotation.

Obviously, many modifications and variations of the present invention are possible in the light of the above teachings. It is therefore to be understood that within the scope of the appended claims the invention may be practiced otherwise than as specifically dscribed.

What is claimed is:

1. A kneecap gauge foot for use in combination with a gauge for dimensional gauging of specimens having a curved contour surface, comprising a cylindrical bar, means at one end of said cylindrical bar for attaching the gauge foot to the leg of a gauge, the other end of said cylindrical bar having a conical depression therein forming a socket, a foot member being supported in said conical depression and being free to rotate therein, said foot member consisting of nearly one-half a steel ball with the almost flat side being a convex surface, the center of the original steel ball and the center of said convex surface coinciding.

2. A kneecap gauge foot for use in combination with a gauge for dimensional gauging of specimens having a curved contour surface, comprising a cylindrical member of magnetic material having means at one end thereof for attachment to a gauge, the other end of said cylindrical member having a conical depression therein forming a socket and being magnetized, a foot member being supported in said conical depression by magnetic attraction and being free to rotate therein, said foot member consisting of one-half a steel ball the flat side of which is ground to a convex surface, the center of the original steel ball and the center of said convex surface coinciding.

3. A device as in claim 2 wherein said cylindrical member is provided with an end slot across said conical depression and is magnetized such that there is both a north and south pole at the slotted end, thus providing a path for magnetic flux through said foot member when gauging magnetic materials.

References Cited in the file of this patent

UNITED STATES PATENTS

| | | |
|---|---|---|
| 1,223,325 | Jaques | Apr. 17, 1917 |
| 1,400,436 | Heil | Dec. 13, 1921 |
| 2,275,036 | Schwartz | Mar. 3, 1942 |
| 2,469,425 | Anderson | May 10, 1949 |
| 2,561,923 | Harmon | July 24, 1951 |